Nov. 8, 1938.   D. A. CHAMBERS   2,135,797
TRIPOD MOUNTING
Filed Feb. 1, 1937
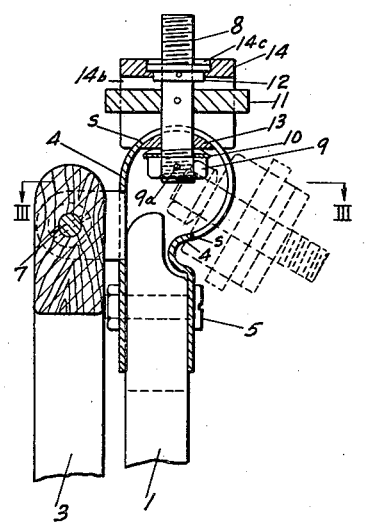
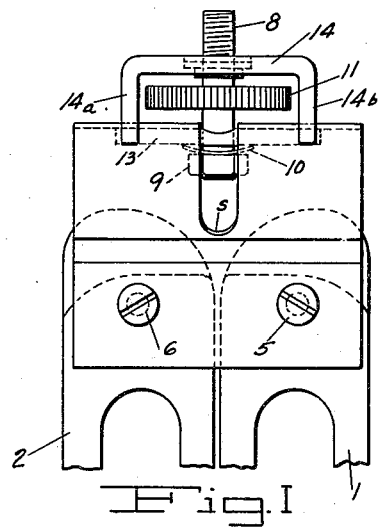
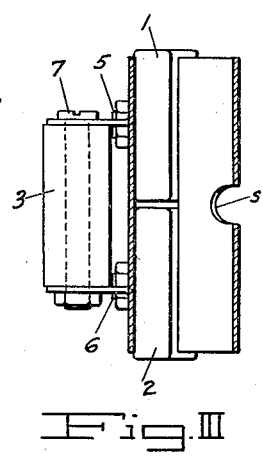
Fig. II   Fig. I   Fig. III
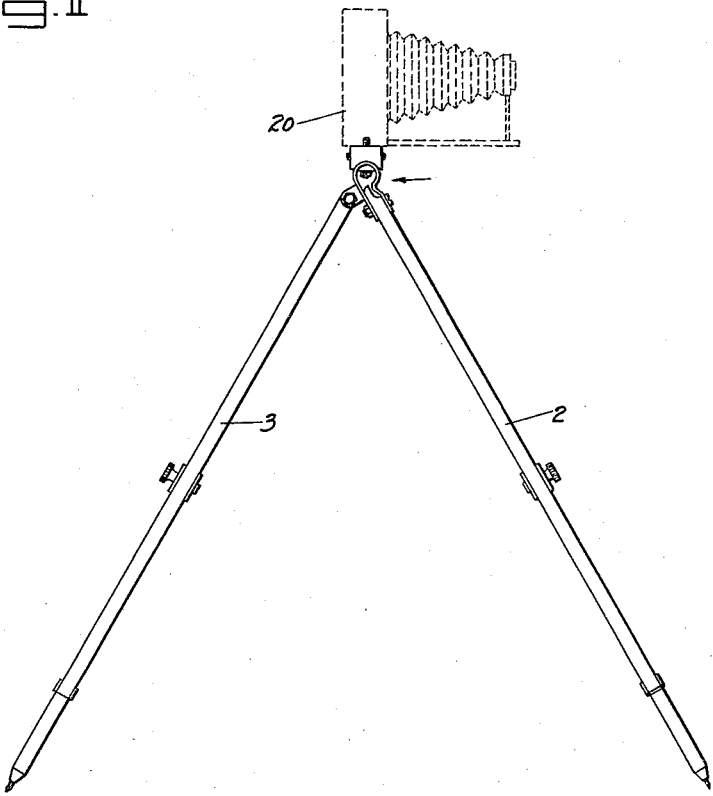
Fig. IV
INVENTOR.
DAVID A. CHAMBERS
BY G. F. McDougall
ATTORNEY Patented Nov. 8, 1938

2,135,797

UNITED STATES PATENT OFFICE 2,135,797

TRIPOD MOUNTING

David A. Chambers, Portland, Oreg.

Application February 1, 1937, Serial No. 123,452

4 Claims. (Cl. 248—185)

This invention relates to devices for mounting an instrument such as a camera on a tripod and has for its object a device that will hold the legs of the tripod so that they can be spread in the usual manner by virtue of a fitting in which the upper ends of the legs are pivotally mounted, the said fitting comprising a base for an instrument support and so constructed that the instrument may be tilted to any desired angle and then fastened at that angle so that it is immovable.

Another object of the invention is a simple and inexpensive mounting for the purpose indicated that moves smoothly but with sufficient frictional resistance so that the instrument may be readily pointed by one looking through it and will hold itself wherever it is left and may be then locked in position rigidly as might be required with a plate holding camera.

A further object is a mounting capable of being set with a fixed frictional engagement sufficient to maintain an instrument where it may be pointed and which incorporates means for increasing the frictional engagement independently of that first referred to, that is without disturbing its adjustment.

These and other objects that will be apparent to those familiar with apparatus of this character will be apparent from the specification and the following drawing which forms a part thereof. In the drawing,—

Fig. I is an enlarged view of the instrument mounting shown at the top of the tripod in Fig. IV when viewing it from the direction of the arrow in Fig. IV;

Fig. II is an orthographic projection of Fig. I, partly in section, to show the interior arrangement of the mounting;

Fig. III is a section on line III—III of Fig. II; and

Fig. IV is a general organization view showing a camera in dotted outline mounted on a tripod having the type of instrument mounting to be described and claimed.

The tripod consists of the three legs, 1, 2 and 3, joined by a metal head 4, which is preferably a metal stamping, and the legs are pivoted to the stamping by the pivots 5, 6 and 7.

The top and one side of the element 4 is circular in outline as shown between the lead in lines of the two numerals 4 in Fig. II and is slotted from s to s in that figure.

A bolt 8 is threaded with a standard thread suitable for the instrument to be used. Rigidly mounted on the bolt are four instrumentalities, a nut 9, spring washer 10, thumb nut 11, collar 12. The half round bar 13, the contour of which fits the inside contour of the arcuate head 4, is provided with a hole in which the bolt 8 will turn.

Mounted upon the external arcuate surface of the element 4 is a saddle 14, provided with a pair of legs 14a and 14b, the legs being rounded to conform to the external surface of the head 4 and frictionally engage it under the influence of the spring washer 10 when the same is partially compressed by the nut 9.

This at the same time produces a downward reaction of the collar 12 which is recessed into the saddle 14 at 14c.

When the initial setting of this apparatus is satisfactory and the resilient tension of the spring washer 10 is sufficient so that the saddle, with an instrument mounted on it, will stay where it is put, then the nut 9 is locked in place, such as by the pin 9a, and the apparatus is ready for use, as shown in Fig. IV, by mounting an instrument such as the camera shown in dotted outline at 20. Then the thumb nut 11 is revolved by finger contact until the bottom of the instrument comes into engagement with the upper surface of the saddle 14 as shown in Fig. IV.

The camera may be swung from side to side using the threaded portion of the bolt 8 as a pivot, or it may be locked in any position by increasing the turning effect on the thumb nut 11, which brings the legs 14a and 14b into forcible engagement with the outer arcuate surface of the head 4. The instrument mounted on the tripod may be pivotally moved on the bolt 8 when the thumb nut 11 is loosened. It may be moved through a vertical arc, to stay where left, after the manner described in the preceding paragraph, or a view centered by a combination of these movements, as desired, after which the thumb nut 11 is tightened which effectively holds the instrument against further movement, relative to the tripod.

Thus it is seen that I have devised an exceedingly simple and effective instrument mounting for a tripod and one which gives a wide range of movement of the mounted instrument as indicated by the dotted outline of the mounting in Fig. II, which shows its extreme movement downward to the right and it obviously has a somewhat less movement downward to the left, or behind the tripod.

With a tripod mounting as described and illustrated, a camera may be pointed to any compass direction, by pivotal revolution on the bolt 8 and tilted as required; then the thumb nut effectively locks both the bolt and the tilting apparatus simultaneously so that successive exposures may be made from the same setting.

Having thus described my new and effective tripod mounting, what I claim as new and desire to secure by Letters Patent is,—

1. A tripod mounting comprising in combination a rounded tubular head portion provided with a cross slot, an instrument saddle rockably mounted in frictional engagement with the head, a rounded bar member inside the tubular head portion, a bolt through the slot that holds the bar and the saddle together and a spring that cooperates with the bolt to maintain frictional engagement between the saddle and the head.

2. The combination according to claim 1, including means for manually turning the bolt and a threaded portion of the bolt that projects above the saddle to engage an instrument.

3. The combination according to claim 1 and including threaded means to engage an instrument on a projecting portion of the bolt and means for manually revolving the bolt into engagement with an instrument that is effective to lock the saddle rigidly to the head.

4. A tripod head including an instrument mounting, defined as a horizontal semi-tubular head portion provided with a cross slot and dependent leg attaching means, a rounded member mounted inside the head, an instrument saddle rockably mounted on the top of the head, a bolt member arranged to hold the rounded member and saddle in predetermined frictional engagement with the head, and instrument engaging means on the bolt that are effective to increase the friction between the saddle and the head to substantial rigidity when an instrument is firmly engaged with the bolt.

DAVID A. CHAMBERS.